United States Patent [19]  
Hendrickson

[11] Patent Number: 4,781,274  
[45] Date of Patent: Nov. 1, 1988

[54] ANTIBACKUP ASSEMBLY

[75] Inventor: Richard J. Hendrickson, Danville, Calif.

[73] Assignee: f.m.e. Corporation, Hayward, Calif.

[21] Appl. No.: 31,479

[22] Filed: Mar. 27, 1987

[51] Int. Cl.⁴ .................... F16D 63/00; F16D 11/04
[52] U.S. Cl. .................... 188/82.1; 188/82.9; 192/46; 403/328
[58] Field of Search .............. 74/527, 531; 188/69, 188/82.1, 82.7, 82.74, 82.77, 82.8, 82.9, 85; 192/41 R, 45.1, 46, 67 P; 403/105, 328, 327, 324, 287

[56] References Cited

U.S. PATENT DOCUMENTS

| 244,671 | 7/1881 | Reynolds | 192/46 |
| 267,638 | 11/1882 | Wright | 188/82.8 |
| 728,802 | 5/1903 | Kahlewind | 192/46 |
| 1,009,836 | 11/1911 | Fowler | 192/46 |
| 1,397,866 | 11/1921 | James | 188/82.74 |
| 2,293,787 | 8/1942 | Worden | 192/46 |
| 3,205,881 | 9/1965 | Hamman | 192/41 R |
| 3,390,897 | 7/1968 | Moore | 403/287 |
| 4,088,008 | 5/1978 | Watling et al. | 403/328 |
| 4,254,852 | 3/1981 | Orozco | 192/46 |
| 4,317,387 | 3/1982 | Myers et al. | 403/328 X |
| 4,615,191 | 10/1986 | Grandy | 403/328 |
| 4,725,027 | 2/1988 | Bekanich | 403/328 X |

FOREIGN PATENT DOCUMENTS 0019473 10/1882 Austria .................. 192/46  
1206450 10/1958 France .................. 188/82.9

Primary Examiner—Andres Kashnikow  
Assistant Examiner—Timothy Newholm  
Attorney, Agent, or Firm—Townsend and Townsend

[57] ABSTRACT

An assembly for preventing reverse rotary rotation of a disc includes openings having circumferentially spaced-apart ends formed in the disc. The leading end has an abutment surface perpendicular to the plane of rotation of the disc. The trailing end of the opening is ramped. Pins are mounted to a stationary support opposite the openings in the disc and are biased toward the disc. The outer end of each pin is sized to fit within the openings and has an abutment surface oriented perpendicular to the plane of rotation of the disc and configured for complementary mating engagement with the abutment surface defining the forward edge of the opening. The outer end of the pin is an angled or ramped surface. Forward rotation of the disc causes the two ramped surfaces to engage, biasing the pin away from the disc. The pin then slides along the surface of the disc until another opening is encountered at which time the process is repeated. Attempted reverse rotary rotation will cause the two abutment surfaces to engage which prevents any further reverse rotation of the disc.

3 Claims, 2 Drawing Sheets

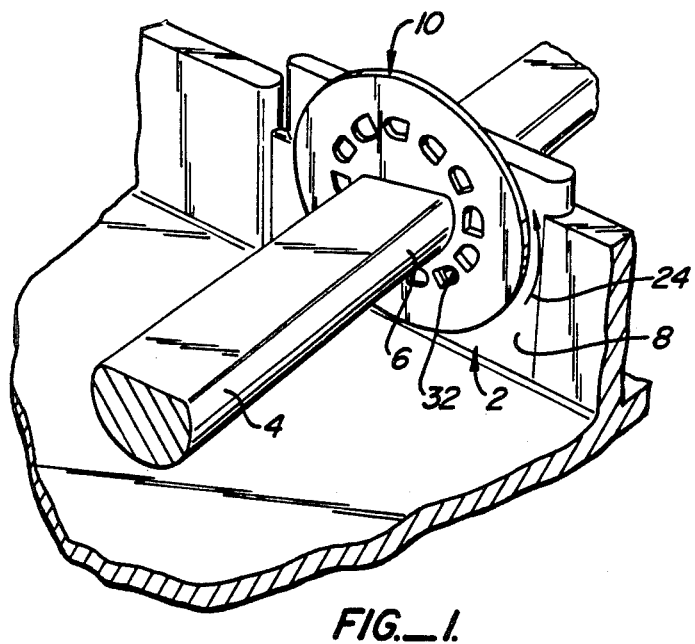
FIG._1.
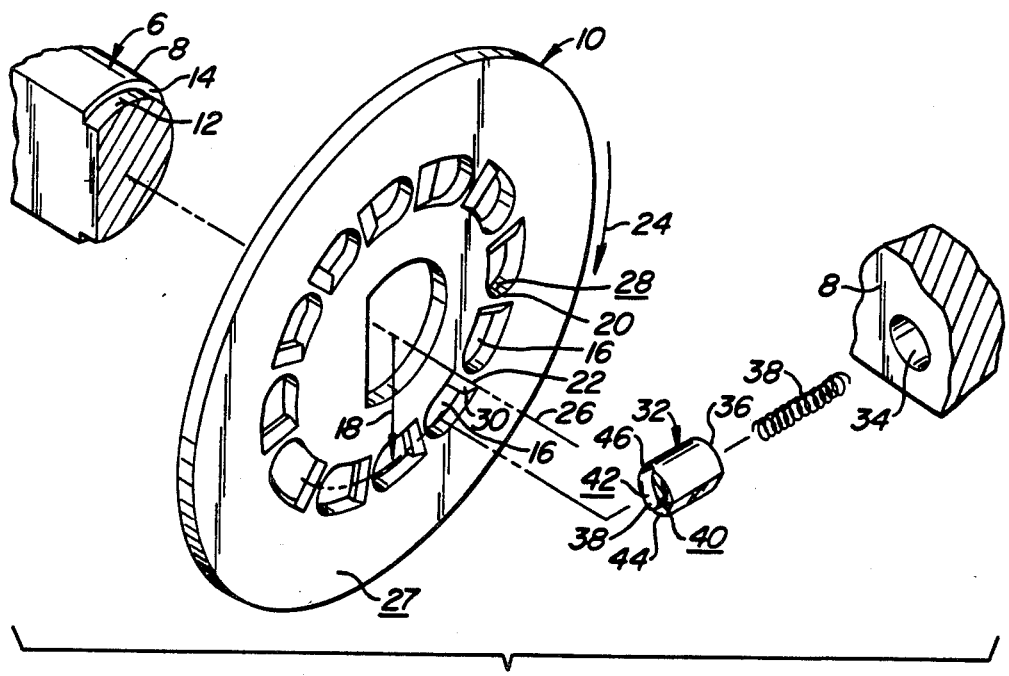
FIG._2.

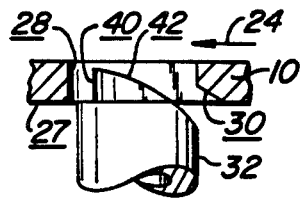
FIG._3A.
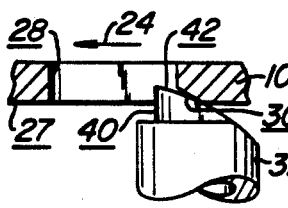
FIG._3B.
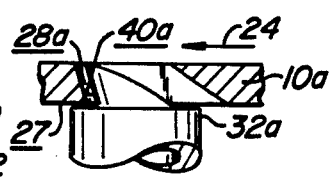
FIG._4.
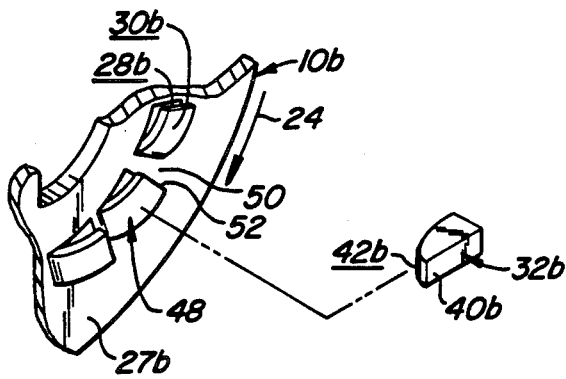
FIG._5.

ANTIBACKUP ASSEMBLY

BACKGROUND OF THE INVENTION

In many situations it is desired to allow a shaft or other rotating member to rotate in a forward rotary direction but to prevent any substantial movement in a reverse rotary direction. For example, postage meters often use a rotating drive shaft to rotate the print head during each metering cycle. For security, one of the requirements for postage meters is that the drive shaft cannot be allowed to be forced to move in a reverse direction. One way to prevent the reversal has been to mount a ratchet wheel on the drive shaft and have spring fingers engage the toothed outer surfaces of the ratchet wheel during rotation. However, it has been found that in some situations such spring fingers have been subject to excessive wear and fracture during use.

SUMMARY OF THE INVENTION

The present invention is directed to an antibackup assembly for preventing the reverse rotation of a member while permitting the substantially unhindered forward rotation of the member.

The antibackup assembly for preventing reverse rotary rotation of a disc or other member relative to a support includes a number of recesses or openings formed within one of the disc and support, preferably the disc, at a common radius. The openings have circumferentially spaced-apart ends. The leading end of the opening, when considered in the direction of rotation, is commonly arranged generally perpendicular to the plane of rotation of the disc. The trailing edge of the opening is preferably ramped. One or more pins are mounted to the stationary support at positions to engage the openings in the disc.

The outer end of each pin is sized to fit within the openings. The outer end has an abutment edge, commonly oriented perpendicular to the plane of rotation of the disc, preferably configured for complementary mating engagement with the abutment edge defining the forward edge of the opening. The outer surface of the outer end of the pin is preferably an angled or ramped guide out surface which slides against the ramped exit surface of the opening. The pin is biased towards the disc so that upon rotation of the disc the outer end of the pin moves into an opening in the disc once the leading edge of the opening passes the trailing, abutment edge of the pin. To keep the pin from passing completely through the opening, the pin can include a shoulder sized to rest against the face of the disc.

Continued forward rotation of the disc causes the two ramped surfaces to engage, biasing the pin away from the disc. The pin then slides along the surface of the disc facing the pins until another opening is encountered, at which time the process is repeated. Attempted reverse rotation will cause the two abutment surfaces to engage. The abutment surfaces are configured so that forcing them together will not bias the pin away from the disc; rather, the two surfaces remain engaged to block reverse rotation of the disc. Preferably the two abutment surfaces are perpendicular to the plane of rotation so that any tendency to push the pin out of the opening is negligible; attempted reverse rotation of the disc is thereby prevented.

The invention provides a simple, trouble-free, effective and rugged means for preventing substantial reverse rotation of a rotating member. Redundancy can be simply achieved by using two or more pins.

Other features and advantages of the invention will appear from the following description in which the preferred embodiments have been set forth in detail in conjunction with the accompanying drawings.

BRIEF DESCRIPTION OF THE DRAWINGS

FIG. 1 is an overall view showing the antibackup assembly of the invention in use to prevent the reverse rotation of a drive shaft.

FIG. 2 is an enlarged, simplified, exploded isometric view of the assembly of FIG. 1.

FIGS. 3A and 3B are cross-sectional views showing a pin at different stages of engagement with an opening.

FIG. 4 is a view similar to FIG. 3A illustrating a disc abutment surface facing away from the pin.

FIG. 5 is an exploded isometric view of alternative embodiments of the disc and pin of FIG. 2.

DETAILED DESCRIPTION OF THE PREFERRED EMBODIMENTS

Referring now to FIG. 1, an antibackup assembly 2 is shown used with a shaft 4 having a D-cross-sectional shape and mounted at one end 6 to a bearing wall 8 for rotation relative to wall 8. Assembly 2 includes an antibackup disc 10 mounted to a reduced diameter portion 12 of shaft 4, as shown in FIG. 2, between a shoulder 14 of shaft 4 and bearing wall 8. Disc 10 has twelve of openings 16 formed in it, openings 16 being positioned at a chosen radius 18. Each opening 16 is generally D-shaped having a curved leading edge 20 and a straight trailing edge 22, the leading and trailing edges being named such based upon the direction of forward rotation indicated by arrow 24. Disc 10 is mounted on shaft 6 to lie perpendicular to axis of rotation 26 with the plane of rotation of disc 10 perpendicular to axis 26. The outer surface 27 of disc 10 is coplanar with the plane of rotation of disc 10. A curved abutment surface 28 is formed along leading edge 20. Abutment surface 28 is perpendicular to the plane of rotation of disc 10, and thus perpendicular to outer surface 27. A ramped exit surface 30 is formed along trailing edge 22.

Assembly 2 also includes a pair of pins 32 mounted within blind holes 34 formed in bearing wall 8 and positioned to lie on radius 18. Pins 32 and holes 34 have complementary D-cross-sectional shapes to prevent pin 32 from rotating within hole 34. Pin 32 is partially hollow at one end 36 so to partially house a spring 37. Spring 37 biases pin 32 towards disc 10.

The outer end 38 of pin 32 is sized to fit within opening 16. Outer end 38 has a curved abutment surface 40 oriented generally perpendicular to outer surface 27 of disc 10 and, thus, generally parallel to axis 26. Abutment surface 40 is curved for engagement with abutment surface 28. Outer end 38 has a ramped guide surface 42. Outer end 38 is substantially surrounded by a shoulder 44 sized larger than opening 16 to limit the travel of pin 32 within opening 16. Ramped guide surface 42 is the greatest distance from shoulder 44 at the end of abutment surface 40 and tapers back to be generally aligned with shoulder 44 at region 46.

Referring now also to FIGS. 3A and 3B, during use disc 10 rotates in the forward direction of arrow 24. As it does s, outer end 38 of pin 32 slides along outer surface 27 until outer end 38 engages an opening 16. This occurs once abutment surface 40 has just cleared leading edge 20. Continued forward rotation of disc 10 will cause pin 32 to move away from disc 10, as shown in FIG. 3B, due to the engagement of curved or ramped surfaces 30, 42. Surface 42 of pin 32 will then slide along outer surface 27 of disc 10 until the next opening 16 is encountered. Any attempted rotation of disc 10 in a reverse rotary direction, that is opposite arrow 24, would cause the engagement of abutment surfaces 28 and 40 which would prevent such rotation upon the contact of such surfaces. Therefore, if openings 16 are spaced at 30° intervals, and assuming pins 32 both engage respective openings simultaneously, the maximum reverse rotation would be up to 30°.

Abutment surfaces 28, 40 are, in the preferred embodiment, generally perpendicular to outer surface 27 of disc 10 and, thus, perpendicular to the plane of rotation of the disc. However, an abutment surface 28a could be formed so that it faces away from a pin 32a, as shown in FIG. 4. The abutment surface 40a of pin 32a is likewise formed for complementary mating engagement with surface 28a. Other configurations for abutment surfaces 28, 40, such as saw-toothed, which keep surfaces 28, 40 engaged when reverse rotary motion is attempted can be used as well.

Turning now to FIG. 5, another alternative embodiment of the invention is shown. Disc 10b has a number of partially punched out, angled tabs 48 extending from its outer surface 27b. A pair of these tabs 48 define a recess 50 between them which functions as opening 16. The outer edge 52 of each tab 48 defines an abutment surface 28b for its associated recess 50 while the outer surface of the following tab 48 acts as a ramped exit surface 30b for that recess 50. In this embodiment, pin 32b has a rectangular cross section with an abutment surface 40b oriented generally perpendicular to outer surface 27b and an arcuate ramped guide surface 42b which engages ramped exit surface 30b and outer surface 27b of disc 10b. Attempted reverse rotation of disc 10b will result in abutment surface 40b contacting abutment surface 28b.

Other modification and variation can made to the disclosed embodiments without departing from the subject of the invention as defined in the following claims. For example, in the preferred embodiments the pins are secured to the stationary support (bearing wall 8) while the recesses are formed in the rotating member (disc 10). However, the rotating member could carry the movable pins 32 and the stationary support could have openings 16 or other recesses formed therein. In the preferred embodiment, disc 10 is used to prevent reverse rotation of shaft 6. However, in appropriate circumstances openings 16 could be formed directly in shaft 6 to prevent reverse rotation of the shaft. In the preferred embodiment, two pins 32 are used to simultaneously engage openings 16 so that any attempted reverse rotation of disc 10 will be resisted by both pins 32. However, pins 32 could be positioned to engage openings 16 at different times which would reduce the maximum possible movement in a reverse rotary direction. Also, two or more rows of openings 16 at different radii 18 could be used at staggered rotary positions to provide almost continuous engagement of pins 32 within openings 16. Although two ramped surfaces 30, 42 are preferably used, one need not be ramped.

I claim:

1. An antibackup assembly for preventing the rotation of a member in a reverse direction while permitting substantially unhindered rotation in a forward direction, the forward and reverse directions being relative to a support, the assembly comprising:

the member having a plurality of openings positioned at a common distance from a center of rotation of the member, each opening having circumferentially spaced-apart ends defining an opening abutment surface and an opening exit surface, the abutment surface oriented generally perpendicular to a plane of rotation of the member;

a pin mounted within a hole in the support for movement towards and away from the disc, the pin being biased towards the disc, the pin being keyed to the hole in the support so to prevent rotary motion of the pin within the hole, while permitting axial movement of the pin within the hole;

the hole positioned so the pin is aligned with the openings as the member rotates, the pin having an outer end sized for engagement within the openings, the outer end of the pin having an abutment surface oriented generally perpendicular to the plane of rotation of the disc and shaped for complementary mating engagement with the abutment surface of the disc so to prevent attempted reverse rotary motion of the member;

the outer end of the pin having a ramped guide out surface configured to engage the opening exit surface so that rotation of the disc in the forward rotary direction causes the opening exit surface and the ramped guide out surface to engage and bias the pin away from the disc and back into the hole in the support so that forward rotary motion of the disc is substantially unimpeded and the pin including a shoulder for engagement with the member when a portion of the pin is housed within one of the openings to prevent further movement by the pin towards the member.

2. The assembly of claim 1 further comprising a plurality of said pins mounted in a plurality of said holes in said support and positioned to engage said openings.

3. The assembly of claim 1 wherein the opening exit surface is ramped.

* * * * *